(12) United States Patent
Ammicht et al.

(10) Patent No.: US 6,788,820 B2
(45) Date of Patent: *Sep. 7, 2004

(54) METHODS AND APPARATUS FOR WAVELET-BASED IMAGE COMPRESSION

(75) Inventors: Egbert Ammicht, Budd Lake, NJ (US); Paul David Davis, Mount Tabor, NJ (US); Richard Robert Shively, Convent Station, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/432,749

(22) Filed: Nov. 3, 1999

(65) Prior Publication Data

US 2003/0190082 A1 Oct. 9, 2003

(51) Int. Cl.[7] ................................................ G06K 9/46
(52) U.S. Cl. ...................................... 382/240; 382/248
(58) Field of Search ................................ 382/232, 233, 382/234, 240, 302, 247, 248, 249, 250; 708/313, 308; 702/6

(56) References Cited

U.S. PATENT DOCUMENTS

| | | | | |
|---|---|---|---|---|
| 5,315,670 A | * | 5/1994 | Shapiro | 382/233 |
| 5,684,693 A | * | 11/1997 | Li | 702/6 |
| 6,009,447 A | * | 12/1999 | Kubota et al. | 708/308 |
| 6,067,383 A | * | 5/2000 | Taniguchi et al. | 382/240 |

OTHER PUBLICATIONS

G. Lafruit et al., "An Efficient VLSI Architecture for 2–D Wavelet Image Coding with Novel Image Scan," IEEE Transactions on Very Large Scale Integration (VLSI) Systems, vol. 7, No. 1, pp. 56–67, Mar. 1999.

* cited by examiner

Primary Examiner—Andrew W. Johns
Assistant Examiner—Duy M. Dang

(57) ABSTRACT

A multi-stage wavelet transform of an image signal is implementing using a first processing element to perform computations for a first stage of the transform, and a second processing element operating in a time-multiplexed manner to perform computations for subsequent stages of the transform. The first processing element includes first and second adder trees for implementing horizontal and vertical filtering operations, respectively, and a set of row buffers configured such that the total number of row buffers is only one more than the number of pixels required to generate a given vertically-filtered output. In a four-stage illustrative embodiment in which the first processing element processes image pixel data at a sample rate of $f_s$, the multi-stage processing element receives inputs from the first stage processing element at a sample rate of $f_s/4$, and generates coefficients for the second, third and fourth stages using sample rates of $f_s/16$, $f_s/64$ and $f_s/256$, respectively. The particular number of stages may be considered a design parameter, and other embodiments may have more or less than four stages. In accordance with the invention, operations performed by the first stage processing element correspond to lowest-level nodes of a binary tree representation of a processing schedule for the multi-stage wavelet transform, and the operations performed by the multi-stage processing element correspond to the remaining nodes of the binary tree representation.

22 Claims, 10 Drawing Sheets

| UNUSED INPUTS IN MEMORY a | PROCESSING NODE (MEMORY) OPERATION $T_r(h,k)$ | OUTPUT PATH |
|---|---|---|
| 3 | NODE 5 (a)-$T_r$(2,4) | b (STEP 3) |
| 2 | NODE 6 (b)-$T_r$(3,2) | c (STEP 4) |
| 3 | NODE 7 (c)-$T_r$(4,1) | d (FINAL) |
| 4 | NODE 1 (a)-$T_r$(2,1) | b (STEP 3) |
| 3 | NODE 2 (a)-$T_r$(2,2) | b (STEP 3) |
| 2 | NODE 3 (b)-$T_r$(3,1) | c (STEP 4) |
| 3 | NODE 4 (a)-$T_r$(2,3) | b (STEP 3) |
| 2 | NOP | - |

FIG. 11

| ROW NUMBER r (MOD 16) | STEP 2 OPERATION Tr(NODE) | STEP 3 OPERATION Tr(NODE) | STEP 4 OPERATION Tr(NODE) |
|---|---|---|---|
| 1 | NOP | NOP | NOP |
| 2 | X(1) | NOP | NOP |
| 3 | NOP | NOP | NOP |
| 4 | XYY(1) | X(3) | NOP |
| 5 | NOP | NOP | NOP |
| 6 | X(2) | NOP | NOP |
| 7 | NOP | NOP | NOP |
| 8 | XYY(2) | XYY(3) | X(7) |
| 9 | NOP | NOP | NOP |
| 10 | X(4) | NOP | NOP |
| 11 | NOP | NOP | NOP |
| 12 | XYY(4) | X(6) | NOP |
| 13 | NOP | NOP | NOP |
| 14 | X(5) | NOP | NOP |
| 15 | NOP | NOP | NOP |
| 16 | XYY(5) | XYY(6) | XYY(7) |

FIG. 12

| k=LL; $0 < i \ 2^{S-h}N, \ 0 < j \ 2^{S-h}M$ | k=HL; $2^{S-h}N < i \ 2^{S-h+1}N, \ 0 < j \ 2^{S-h}M$ |
|---|---|
| k=LH; $0 < i \ 2^{S-h}N, \ 2^{S-h}N < j \ 2^{S-h+1}M$ | k=HH; $2^{S-h}N < i \ 2^{S-h+1}N, \ 2^{S-h}N < j \ 2^{S-h+1}M$ |

| π(i,j) | $4^{S-1}$ | $4^{S-2}$ | $4^{S-3}$ | ... | 1 |
|---|---|---|---|---|---|
| | | | | | |
| | | | | | | h=1     h=2  h=3   ...   h=S

METHODS AND APPARATUS FOR WAVELET-BASED IMAGE COMPRESSION

GOVERNMENT SUPPORT

This invention was made with U.S. Government support under Agreement No. NMA202-97-9-1050 awarded by the National Imagery and Mapping Agency. The U.S. Government has certain rights in the invention.

RELATED APPLICATION

The present invention is related to the invention disclosed in U.S. patent application Ser. No. 09/429,467 of E. Ammicht et al., filed Oct. 28, 1999 and entitled "Improved Coefficient Computation in Image Compression Using Set Partitioning in Hierarchical Trees," which is incorporated by reference herein.

Field of the Invention

The invention relates generally to encoding of image signals, and more particularly to memory-efficient encoding techniques for use with such signals.

BACKGROUND OF THE INVENTION

Transformation of an image comprising a two-dimensional array of picture elements (pixels) by use of wavelet basis functions has been found to provide a very effective means for achieving a significant reduction in the amount of information required to represent the image, with minimal loss in perceivable resolution. Several wavelet-based image coding standards have been proposed recently for use in image compression applications.

The wavelet transform, which is the first stage in an image compression process, typically involves applying a multi-stage iterative filter-and-decimate process to the image to yield an array of coefficients equivalent in dimension to the original image. A two-dimensional wavelet transform can be implemented as the convolution of two one-dimensional filters. In such an approach, the image rows are filtered individually to yield an array equal in size to the image, and then the columns of this resultant array of coefficients are filtered to again yield the same size array. The same processing is subsequently applied to a sub-array of the resultant array as the second stage of the image compression process, etc. Typically four to six or more such filter-and-decimate stages of processing are applied.

FIG. 1 shows the functional data flow in the first stage of a conventional wavelet transform. Pixel input by row at a sample rate of $f_s$ is filtered in a horizontal filter comprising a low pass filter 10 and a high pass filter 12 to generate low pass and high pass portions, respectively, of a coefficient array 15. The low pass filter 10 and high pass filter 12 each operate at sample rates of $f_s/2$. The coefficient array 15 is then filtered in a vertical filter including high pass and low pass filter pairs 16, 17 to generate a coefficient array 18. Each of the coefficient arrays 15 and 18 is the same size as the original image.

Because the image size measured in pixel count is both large and variable, e.g., 2 million pixels for a high definition television (HDTV) image up to more than 10 million pixels for high-resolution satellite images, it is generally not practical to implement an integrated circuit wavelet processor capable of both performing the above-described transform and storing the entire image and/or intermediate results. It is also prohibitively expensive to provide the capability to stream the original image at real-time rates through the chip for horizontal filtering with results written to memory, then re-access the resultant array column-by-column, i.e., in transposed form, to perform the vertical filtering, and to repeat this process for multiple stages. For example, in the case of HDTV, pixels arrive at the rate of 60 million/second and include both light intensity (luma) and color (chroma) values. Requiring the memory read/write cycle time to be several times as fast as the pixel period, i.e., a cycle time of one quarter or less of the 16 nanosecond pixel period, would generally require expensive memory devices and complex supporting technologies such as, e.g., address generation.

A need therefore exists for improved wavelet transform techniques which are suitable for use in image compression and other applications, and which avoid the excessive memory and processing costs associated with conventional wavelet transforms.

SUMMARY OF THE INVENTION

The invention provides improved wavelet transform techniques which implement a "transpose on the fly" concept that results in substantially reduced memory and computational requirements. In accordance with the invention, a multi-stage wavelet transform of an image signal is implementing using a first processing element to perform computations for a first stage of the transform, and a second processing element operating in a time-multiplexed manner to perform computations for subsequent stages of the transform. The first processing element includes first and second adder trees for implementing horizontal and vertical filtering operations, respectively, and a set of row buffers configured such that the total number of row buffers is only one more than the number of pixels required to generate a given vertically-filtered output. In a four-stage illustrative embodiment in which the first stage processing element processes image pixel data at a sample rate of $f_s$, the multi-stage processing element receives inputs from the first stage processing element at a sample rate of $f_s/4$, and generates coefficients for the second, third and fourth stages using sample rates of $f_s/16$, $f_s/64$ and $f_s/256$, respectively, in accordance with a time-multiplexed processing schedule. The particular number of stages may be considered a design parameter, and other embodiments may have more or less than four stages. For example, a six-stage embodiment may be configured in which the multi-stage processing element generates coefficients for the second through sixth stages.

In accordance with another aspect of the invention, the time-multiplexed schedule for processing operations may be generated as a binary tree representation in the form of a synchronous data flow (SDF) graph. The operations performed by the first stage processing element correspond to the lowest-level nodes of the binary tree representation of the processing schedule, and the operations performed by the multi-stage processing element correspond to the remaining nodes of the binary tree representation.

Advantageously, the invention provides a wavelet transform structure that is capable of performing recursive, multi-stage processing on variable-sized images, and without the increased memory speed requirements associated with streaming of intermediate results in and out of image memory. In accordance with the invention, the latency or in-process delay is minimized by starting successive stages of processing as soon as the requisite inputs become available. Moreover, the invention implements a processing structure that can be time-multiplexed among several stages of wavelet transform processing simultaneously, by exploiting similarity in successive wavelet transform processing stages.

BRIEF DESCRIPTION OF THE DRAWINGS

FIG. 11 shows actual computations for the second, third and fourth stages of the illustrative four-stage wavelet transform as executed in accordance with the FIG. 10 schedule.

FIG. 12 shows four different quadrants of an illustrative wavelet transform matrix in accordance with the invention.

DETAILED DESCRIPTION OF THE INVENTION

The invention will be illustrated below in conjunction with exemplary wavelet transforms as applied to image compression applications. It should be understood, however, that the techniques described herein may be applied to other types of image signals, and in other image signal processing applications. The term "image signal" as used herein is intended to include, e.g., an image, a video frame or field, as well as portions or combinations of these and other information signals.

The invention relates to implementation of a wavelet transform in support of image compression. More specifically, an illustrative embodiment of the invention provides a wavelet transform structure that is capable of:

1. Performing recursive, multi-stage processing on variable-sized images and without the increased memory speed requirements associated with streaming of intermediate results in and out of image memory;
2. Minimizing the latency, i.e., the in-process delay, by starting successive stages of processing as soon as the requisite inputs become available; and
3. Exploiting similarity in successive stages of wavelet transform processing by implementing a processing structure that can be time-multiplexed among several stages of processing simultaneously.

Transpose "On The Fly"

A key aspect of the present invention is that of providing sufficient local memory cells within a wavelet transform processor to hold at least one more than the number of processed rows of coefficients in order to support computing a single sample in the vertical dimension. Thus, because the span of the wavelet filters used in the illustrative embodiment is nine pixels, this aspect of the invention is implemented in the illustrative embodiment by providing memory cells sufficient to store 10 rows of coefficients. This is typically a small fraction of the total number of rows in the image. For example, in HDTV applications, the total number of rows in the image is 1920.

Figure 1:
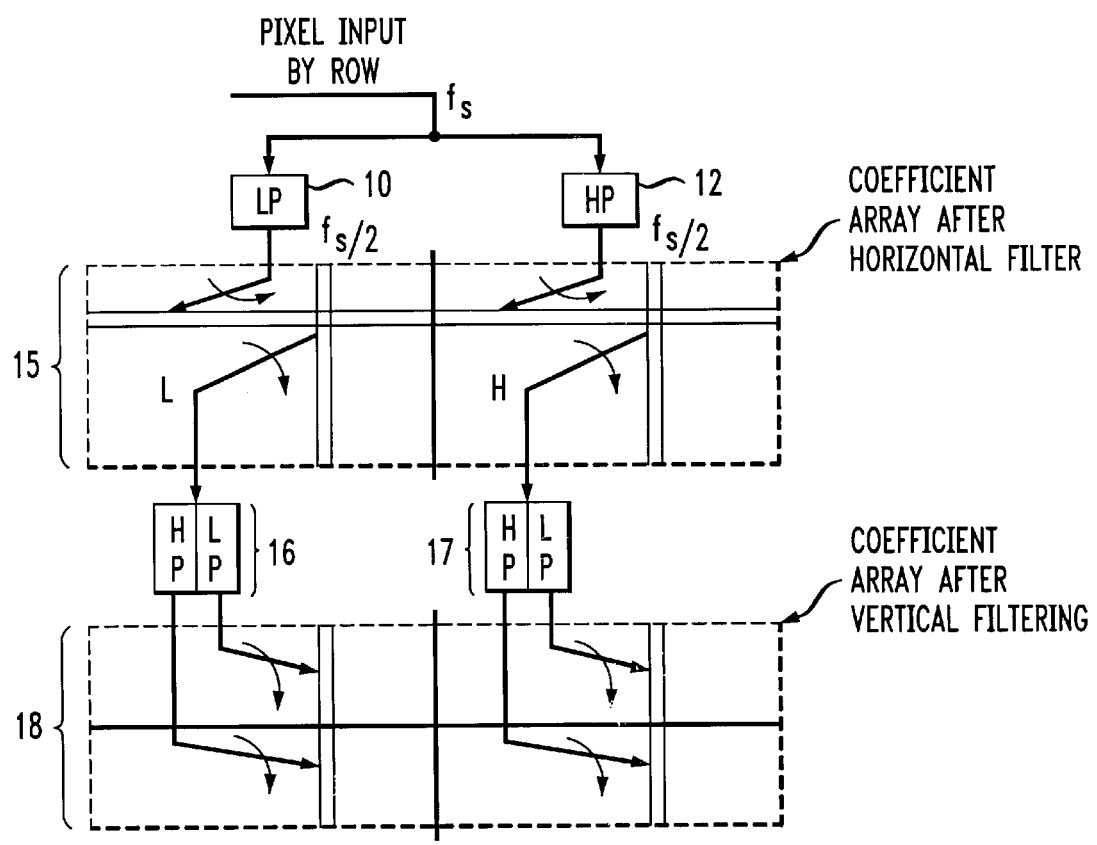
FIG. 1 shows the functional data flow in a first stage of conventional wavelet transform process.
Figure 2:
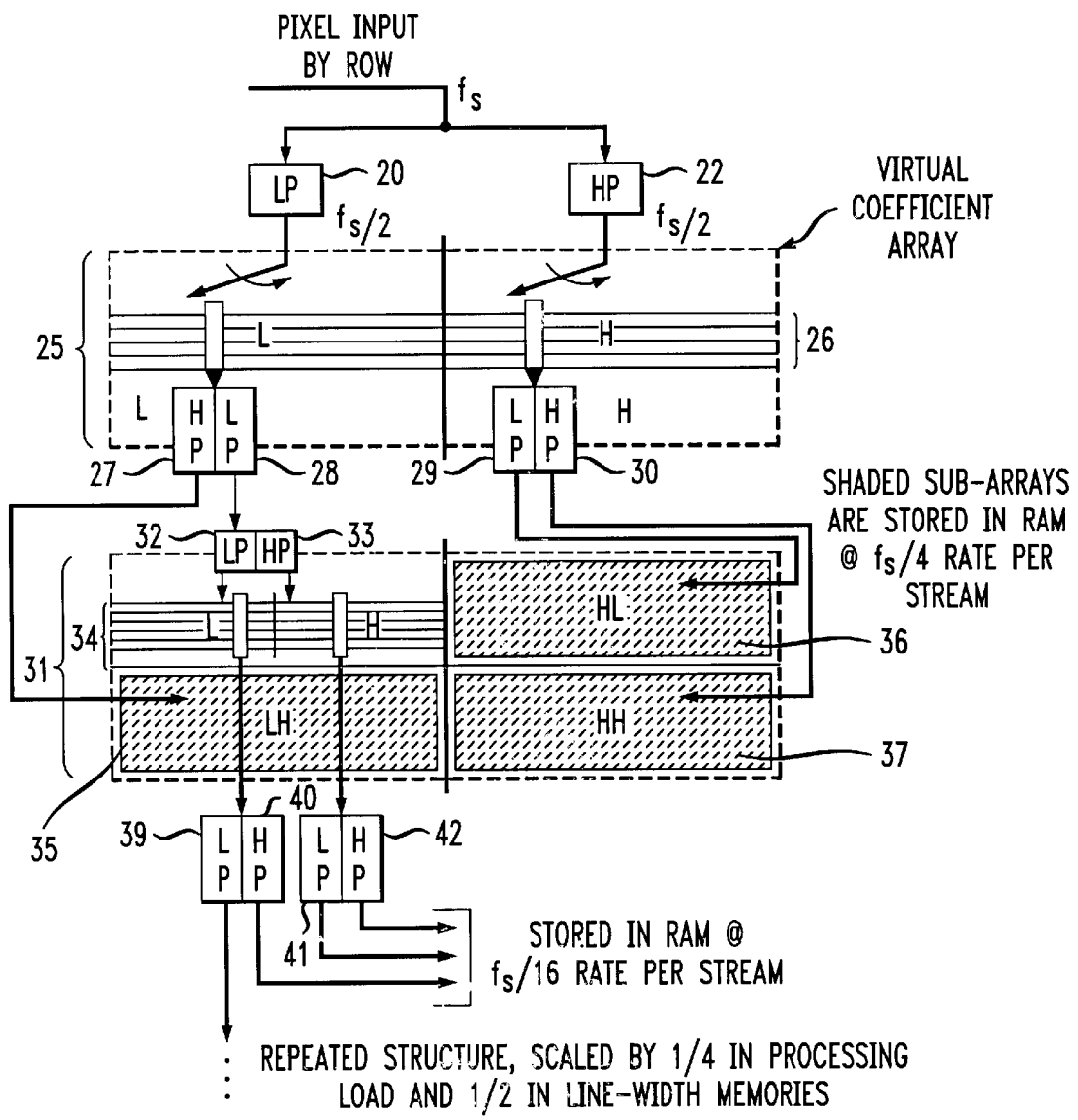
FIG. 2 shows the functional data flow in the first stage of a wavelet transform process in accordance with the invention.

FIG. 2 shows the functional data flow in the first stage of a wavelet transform in the illustrative embodiment of the invention. Pixel input by row at a sample rate of $f_s$ is filtered in a horizontal filter comprising a low pass filter 20 and a high pass filter 22 to generate low pass and high pass portions, respectively, of a virtual coefficient array 25. The low pass filter 20 and high pass filter 22 each operate at sample rates of $f_s/2$. The coefficients are stored in a 10-row buffer 26, which is filled in round-robin order. As previously noted, this 10-row buffer may be implemented on-chip with the wavelet processor that performs the wavelet transform. The low pass and high pass coefficients from the 10-row buffer 26 are applied to low pass and high pass filter pairs 27, 28 and 29, 30, respectively. Each of the filter pairs 27, 28 and 29, 30 operates at a sample rate of $f_s/2$, i.e., each of the filters 27, 28, 29 and 30 operates at a sample rate of $f_s/4$.

The outputs of the filter pairs 27, 28 and 29, 30 are applied to different portions of a coefficient array 31. More specifically, the output of the low pass filter 28, which is at a sample rate of $f_s/4$ is further filtered in a low pass and high pass filter pair 32, 33, and the resulting coefficients are stored in a 10-row buffer 34. Each of the outputs of the filter pair 32, 33 operates at a sample rate of $f_s/8$. At the output of the low pass filter 28, the first stage low pass column outputs are row filtered for the next stage. This output thus represents column low pass and high pass filtering results generated by row. The outputs of the high pass filter 27, the low pass filter 29 and the high pass filter 30 are applied to shaded sub-arrays 35, 36 and 37, respectively. The shaded sub-arrays are stored in random access memory (RAM) at a sample rate of $f_s/4$ for each stream. The outputs of the 10-row buffer 34 are applied to low pass and high pass filter pairs 39, 40 and 41, 42. The outputs of these filters are stored in RAM at a sample rate of $f_s/16$ per stream. For the next stage of the wavelet transform processing, the structure shown is repeated, but scaled by a factor of ¼ in processing load and ½ in line-width memory.

Figure 3:
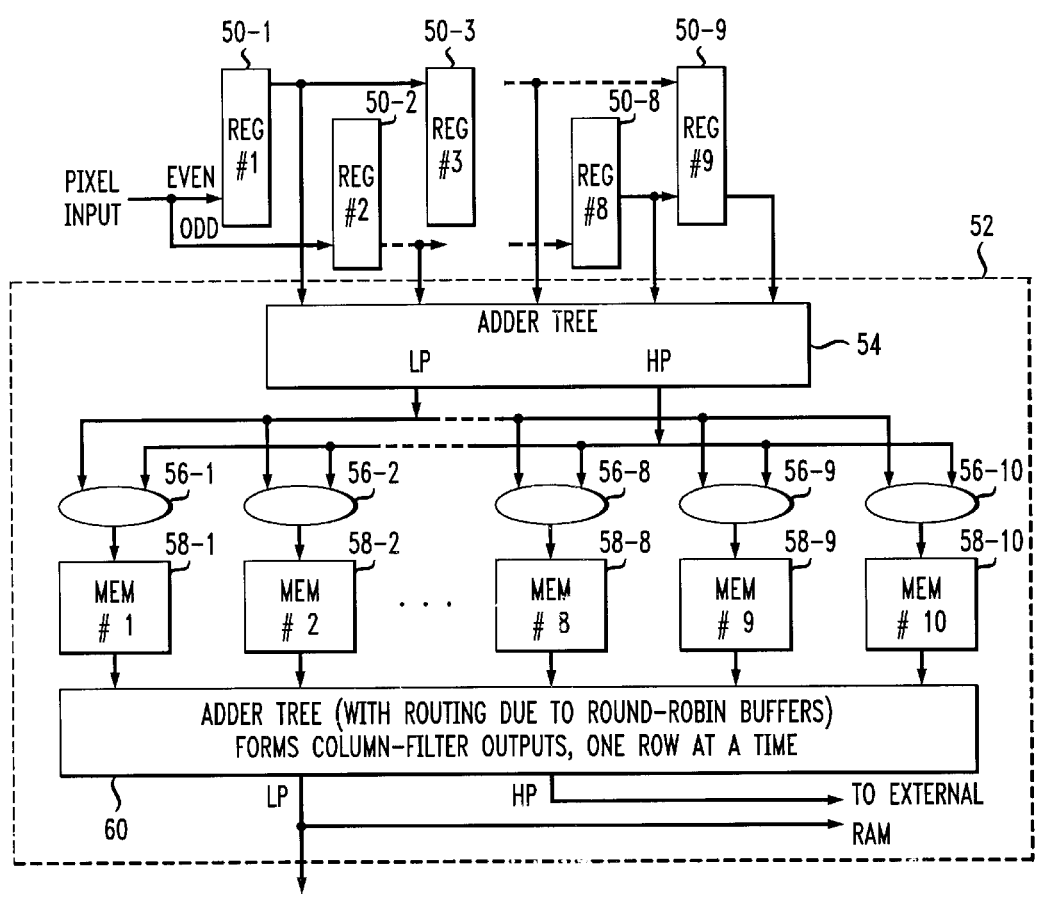
FIG. 3 shows a hardware diagram of a wavelet processor in accordance with the invention for implementing the wavelet transform process of FIG. 2.

FIG. 3 shows a hardware diagram of a portion of a wavelet processor for implementing the wavelet transform process shown in FIG. 2. In this embodiment, pixel input at 60 MHz is gated to a 30 MHz rate by applying even samples to input registers 50-1, 50-3, . . . 50-9, and odd samples to input registers 50-2, . . . 50-8. The block 52 represents a hardware realization of one stage of horizontal and vertical filtering. The block 52 includes a first adder tree 54 which provides horizontally-filtered low pass and high pass outputs to a set of ten multiplexers 56-1, 56-2, . . . 56-10. The low pass and high pass filter outputs of adder tree 54 are generated at a 30 MHz rate using a nine-sample history.

The multiplexers 56-1, 56-2, . . . 56-10 select one of the low pass or high pass outputs of the first adder tree 54 for application to corresponding memory cells 58-1, 58-2, . . . 58-10, each of which has a one-row capacity. Each of the memory cells in this embodiment has a size of 16×2160, and is operated at a clock rate of 60 MHz. The low pass and high pass outputs of the adder tree 54 are stored interleaved in the memory cells 58-1, 58-2, . . . 58-10. The multiplexers 56-1, 56-2, . . . 56-10 ensure that the HP and LP filter outputs generated simultaneously by the adder tree 54 are written into successive locations in the row-storage memory cells 58-1, 58-2, . . . 58-10. The outputs of the memory elements 58-1, 58-2, . . . 58-10 are applied as inputs to a second adder tree 60 which implements vertical filtering. The second adder tree includes appropriate circular shifting at its input to take into account the round-robin buffering in the memory cells, and forms vertical column filter outputs, one row at a time. Because the horizontal filter low pass and high pass outputs of the adder tree 54 are stored interleaved, and because only the vertical low pass outputs of the low pass inputs are saved for further processing, the outputs of the second adder tree 60 are at 15 MHz rate, i.e., an $f_s/4$ rate.

The first and second adder trees 54 and 60 in FIG. 3 represent combinational dot-product networks capable of performing the filter dot-product results at the specified sample rate. Note that by specializing these networks to the specific set of coefficients in question, considerable simplification is achieved. In one possible formulation, all coefficients involve one or two non-zero digits, such that the adder tree can form the sum of products using less circuit complexity than a single general-purpose multiplier. In any case, the symmetry of wavelet filters can be exploited to halve the apparent number of multiplications by adding pairs of sample values prior to multiplication. If the clock rate and the particular digital technology utilized in the network is not fast enough to generate the entire dot-product result in a single clock cycle, "pipelining" can be applied, i.e., the network can be operated as a multi-stage assembly line, in order to maintain the clock rate production of dot products.

In the transpose "on the fly" concept as implemented in FIG. 3, the filtered outputs of the adder tree 54 are applied to the one-row-capacity memory cells 58-1, 58-2, . . . 58-10 in a round-robin manner, overwriting the oldest row with the newest result, such that the most recent N rows are held at any time, where N is the length of the vertical filter. Since the oldest row is beyond the span of the filter, it is no longer of use.

A common address bus drives all of the memory cells 58-1, 58-2, . . . 58-10. As the adder tree results for the current row are written into the selected memory cell, all other cells are simultaneously read as outputs to the second adder tree 60 which is performing the vertical column filter operations. Because the common address bus results in reading the corresponding value from each of N consecutive rows, a row of vertically-filtered output values are formed each time a new row of horizontally-filtered values is written into one of the memory cells. The vertical-filter adder tree 60 includes a circular shift at its input in order to account for the round-robin application of inputs to the memory cells.

Advantageously, by starting the vertical filtering in adder tree 60 as soon as there are sufficient intermediate results to support it, and doing so recursively in successive stages, the processing latency is minimized. Moreover, by sizing the memory cells 58-1, 58-2, . . . 58-10 to accommodate the longest row length of interest, the size of images transformed in this manner is otherwise unconstrained.

Wavelet Transform Processor Structure

The above-described wavelet transform for image compression involves multiple stages of substantially identical transforms, with each stage other than the first stage operating on a sub-array of one-quarter of the prior stage outputs.

Figure 4:
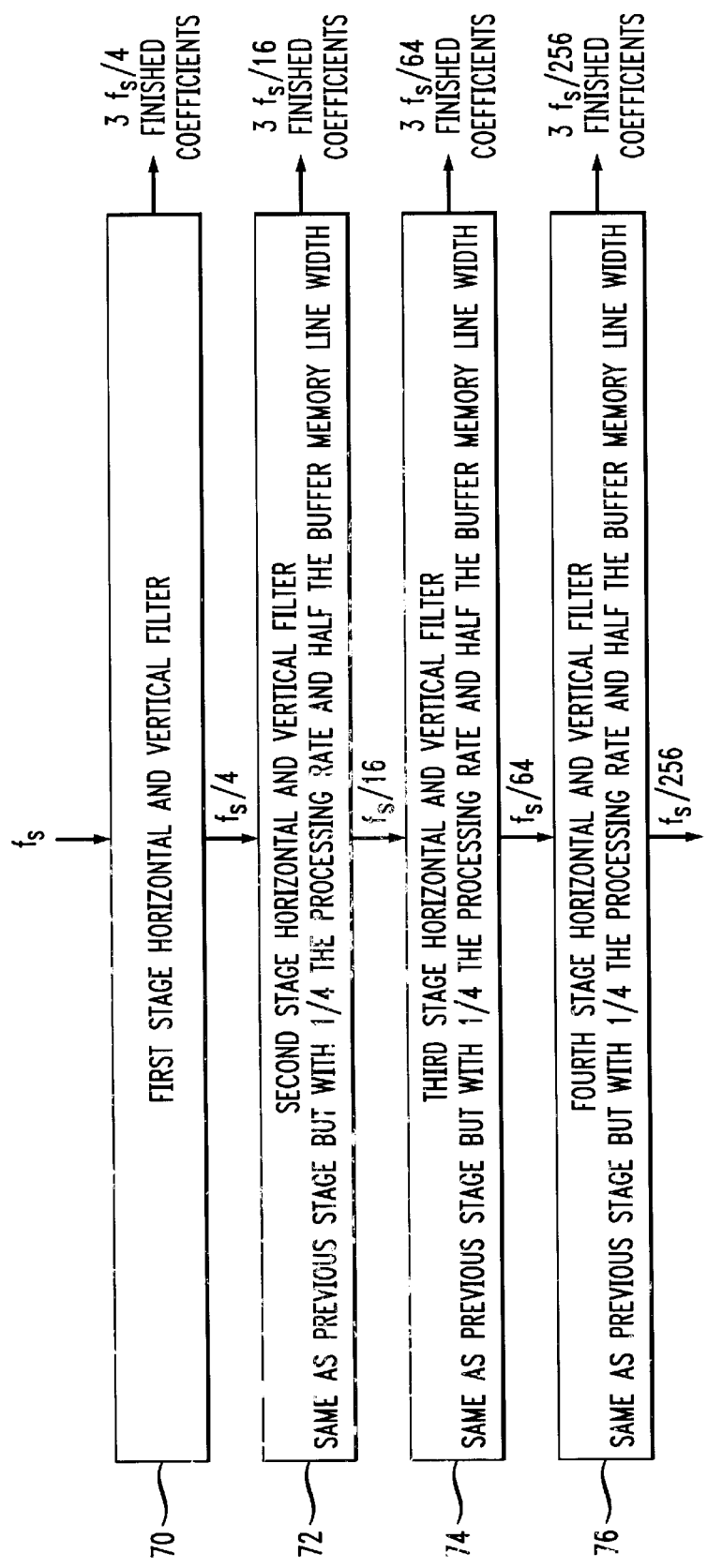
FIG. 4 illustrates the data flow between stages of a four-stage wavelet transform process in accordance with the invention.

FIG. 4 illustrates the data flow between stages in a four-stage wavelet transform process in accordance with the invention. A first stage horizontal and vertical filter 70 receives inputs at sample rate $f_s$ and supplies outputs at sample rate $f_s/4$ to a second stage horizontal and vertical filter 72, while generating $3f_s/4$ finished coefficients. The first stage filter 70 may be implemented as shown in block 52 of FIG. 3. The second stage filter 72 may be implemented in the same manner as the first stage filter 70, but operates at ¼ the processing rate and with half the buffer memory line width, and generates $3f_s/16$ finished coefficients. Similarly, third and fourth stage filters 74 and 76 operate at ¼ the processing rate and with half the buffer memory line width of their respective prior stages, and generate $3f_s/64$ and $3f_s/256$ finished coefficients, respectively.

Figure 5:
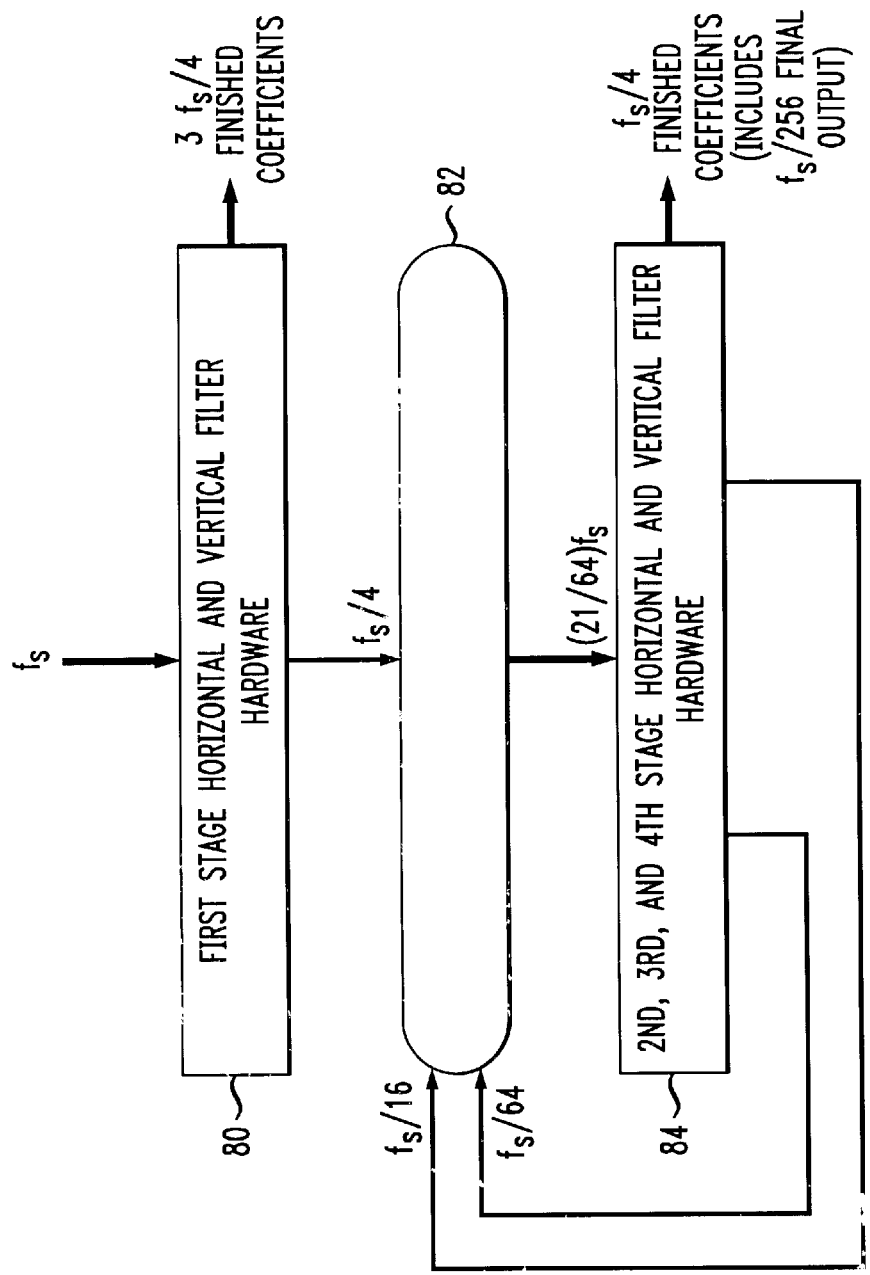
FIG. 5 illustrates a time-division multiplexed approach to implementing the second, third and fourth stage processing of the four-stage wavelet transform process of FIG. 4 in a single replicated set of first stage processing hardware.

The sum of the processing required in the second through fourth stages 72 through 76 of FIG. 4 is less than that required for the first stage 70. A single replication of the first stage processing hardware can therefore be used to implement all subsequent stages in a time-division multiplexed manner, as is illustrated in FIG. 5. In this figure, first stage horizontal and vertical filter hardware 80 processes pixel input at a rate of $f_s$ and generates $3f_s/4$ finished coefficients. A sub-array of its outputs is applied at an $f_s/4$ sample rate to a multiplexer 82. The multiplexer 82 delivers the outputs of the first stage hardware 80 to a second set of horizontal and vertical filter hardware 84 that implements the second, third and fourth stages in a time-multiplexed manner. The multiplexer 82 multiplexes the $f_s/4$ outputs of the first stage with $f_s/16$ and $f_s/64$ outputs of the second and third stage, respectively. The output of the second set of filter hardware 84 is $f_s/4$ finished coefficients, which includes the $f_s/256$ output of the fourth and final stage.

It should be noted that the particular number of stages in a wavelet transform process in accordance with the invention may be considered a design parameter, and other embodiments of the invention may have more or less than four stages. For example, a six-stage embodiment may be configured in which a multi-stage processing element generates coefficients for the second through sixth stages.

An important aspect of the time-division multiplexed approach illustrated in FIG. 5 is the determination of an appropriate schedule which allows the successive stages of processing to be multiplexed. Such a schedule will be described in greater detail below.

The description to this point has been directed to performing a wavelet transform on light intensity or luma content alone. In color video, the color or chroma is typically sub-sampled, such that two successive luma measurements are accompanied by one chroma red (Cr) and one chroma blue (Cb), resulting in three distinct arrays to be transformed, the latter two arrays (chroma arrays) each being one-half the size of the first array (luma array). Ignoring the first stage of processing, it can be shown that the second and subsequent stages of processing for the two chroma arrays can be implemented with the same processing hardware used to implement the second and subsequent stages of processing for the luma array, resulting in a highly-efficient wavelet transform processor.

Hardware Implementation of Non-Standard Wavelet Transform

It will now be shown that the wavelet transforms in one or more dimensions can be partitioned into identical units of processing, such that a resulting synchronous data flow (SDF) graph forms complete binary trees with data flowing from the leaves to the root of the tree. A so-called "synchronous actor" produces and consumes a fixed number of tokens on each of a fixed number of input and output paths. An SDF includes only synchronous actors, and is described in greater detail in, e.g., E. A. Lee and J. C. Bier, "Architectures for Statically Scheduled Dataflow," Journal on Parallel and Distributed Systems, December 1990. The present invention provides a processing schedule for an SDF graph such that:

1. The schedule can be realized in hardware by two nearly identical processing units, such that the first unit, which performs first stage processing, computes the lowest level of the binary tree, while the second unit, which performs multi-stage processing for the remaining stages in a time-multiplexed manner, processes all the remaining nodes.
2. The computational complexity of the multi-stage processing unit is less than that of the first stage processing unit. Therefore, if the first stage is designed to run in real time for a continuous stream of input data, the computation as a whole can be carried out in real time.
3. The schedule exhibits the minimum possible processing latency.

Given a data set of length $2^S N$, a one-dimensional discrete wavelet transform may be computed by filtering the data with a high pass and a low pass finite impulse response (FIR) filter, and decimating the results by two. In this case, one obtains two data sets, the high pass filter outputs and the low pass filter outputs, each of size $2^{S-1}N$. This operation is applied recursively to the low pass filter outputs for a total of S steps.

Two approaches may be used to generalize this transform to two dimensions. For a matrix of size $(2^S N) \times (2^S M)$, these approaches are:

1. Standard decomposition, i.e., the application of all S steps of a one-dimensional wavelet transform to each row of the matrix, followed by the application of all S steps of a one-dimensional wavelet transform to each column of the previous result.
2. Non-standard decomposition, i.e., the application of both the row and column filter pairs at every one of S steps. The operations required thus include first performing a low and high pass filtering operation on every row of the matrix, followed by a similar low and high pass filtering operation on every column of the previous result. These operations are applied recursively S times on the outputs of the low pass filters in both directions, i.e., on a quarter of the input data of the previous step.

In the following, the non-standard decomposition is analyzed in greater detail. It should be noted that the results obtained are attributable to the decimation by two that occurs for the filter operations. Thus analysis of similar operations for other wavelet transforms in one or more dimensions similarly shows them to be amenable to two-unit hardware realizations with operation schedules that can be readily derived by applying the results described herein. Given high pass and low pass filter coefficients $w^H_j$ and $w^L_j$ respectively, the x-transform is defined to be the operation of these filters an a set of contiguous row elements of a matrix $p_{ij}$ $$p'_{ij} = \sum_{k=0}^{F_L-1} w^L_k p_{2i-k,j}, \quad p'_{2h-1 N+ij} = \sum_{k=0}^{F_H-1} w^H_k p_{2i-k,j} \quad (1)$$

at any given step h=1, 2, ..., S, where i=1, 2, ..., $2^{h-1}N$, and j=1, 2, ..., $2^{h-1}N$. Similarly, the y-transform is defined as the operation of the same filters on a set of contiguous column elements, i.e., $$p''_{ij} = \sum_{k=0}^{F_L-1} w^L_k p'_{i,2j-k}, \quad p''_{i2h-1 N+j} = \sum_{k=0}^{F_H-1} w^H_k p'_{i,2j-k} \quad (2)$$

where i=1, 2, ..., $2^{h-1}M$, and j=1, 2, ..., $2^{h-1}M$. The designator h is used herein to denote both transform steps and levels or height in a binary tree representation of the transform. The constants $F_L$ and $F_H$ are the number of filter taps for the low and high pass filters, respectively. Note that the x and y-transforms therefore need a data history of length $$F = \max(F^L, F^H). \quad (3)$$

Figure 6:
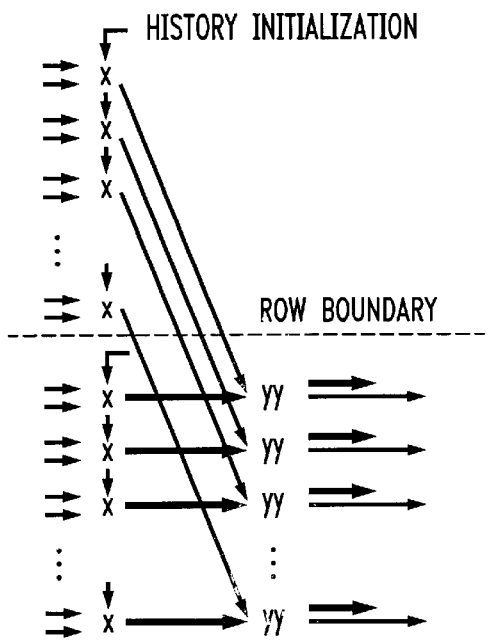
FIG. 6 shows a data flow graph for a non-standard wavelet decomposition in accordance with the invention.

FIG. 6 shows a data flow graph illustrating these computations for a pair of rows. A given row of inputs allows x-transforms to run for each set of two inputs, producing two row outputs at a time. The vertical arrows in the figure represent the data history required by the filters. Once a row is complete, each new x-transform completes the inputs for two y-transforms. Three of the results are final, and the fourth is an entry in the quadrant that will be processed in the next step. The pattern repeats for every row pair. The computations may be scheduled in any order that does not violate the presence of prerequisites. The required data histories generally must be initialized for each row.

More particularly, for the first $2^{h-1}N$ size set of input value pairs (i.e., for a complete row for step h), the required x-transforms may be executed immediately, yielding an intermediate result for the first step of the calculation. For the next $2^{h-1}N$ set of input value pairs, in addition to each of the x-transforms, two corresponding y-transforms may execute, since two new column pairs (a low and a high pass filter output) will have become available. Each of the y-transforms in turn produces two results. The low pass x/low pass y result forms an input for the next step in the transform, while the remaining three outputs (high-x/low-y, low-x/high-y, high-x/high-y) are final. The next step is identical to the current step, but operates on only a quarter of the original data.

Another consideration is edge effects, i.e., for an x or y-transform to execute, F row or column data elements must be available. This translates into a requirement that the column history must be initialized prior to beginning the wavelet transform of the matrix, while the row must be initialized prior to starting computations for a new row.

As noted previously, the operations depicted in FIG. 6 can be carried out in any order that does not violate the presence of data prerequisites. Two possible examples are 1. Greedy scheduling: process a complete row of x-transforms (resulting in intermediate values only), then process xyy triplets, producing three final outputs and a next stage input each time. The pattern repeats: x-transforms only for odd rows, xyy-transforms resulting in outputs for even rows.
2. Row by row scheduling: process two complete rows with the x-transform, then process the results with y-transforms, a column at a time. Repeat this pattern until all rows have been processed.

There are two distinct phases in each of the examples above. If processing occurs sequentially on the input data, there is a period of time during which no outputs are produced (odd row processing). All outputs are produced in the second phase (even row processing). In addition, y-transform pairs depend only on the intermediate results of two x-transform pairs acting on row elements from the same two columns. This suggests modification of the SDF graph by changing the granularity of the computations to the xxyy-transform set corresponding to the set of matrix elements given by $\{p_{2i+1\ 2j+1}, p_{2i+2\ 2j+1}, p_{2i+1\ 2j+2}, p_{2i+2\ 2j+2}\}$.

Figure 7:
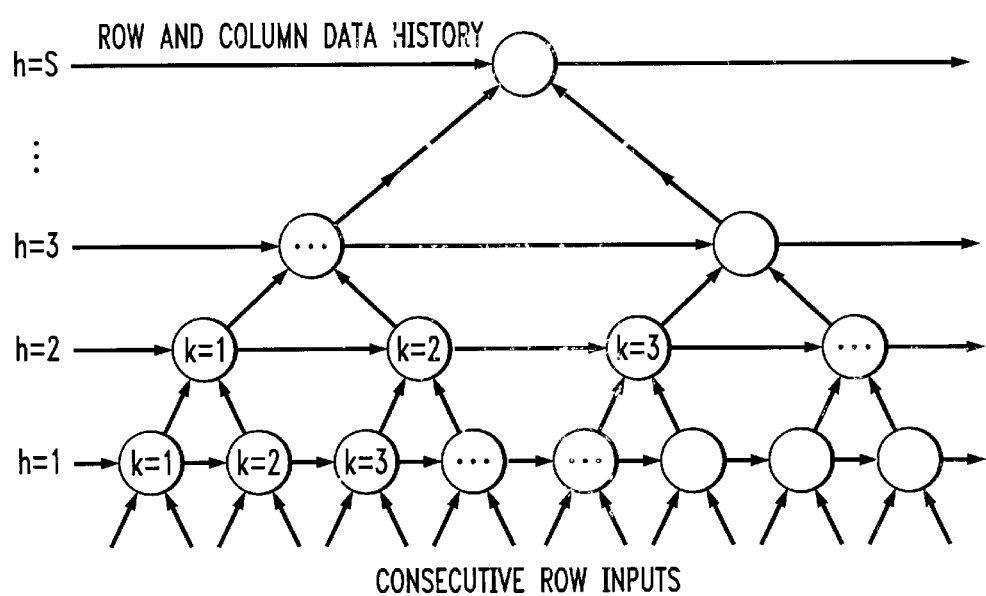
FIG. 7 shows a binary tree representation of a synchronous data flow (SDF) graph for a non-standard wavelet decomposition in accordance with the invention.

FIG. 7 shows the resulting SDF graph, in which nodes represent xxyy-transforms. Each level in the graph corresponds to computations in a given step h=1, 2, . . . , S of the transform. The total height of the graph is S. The graph repeats periodically N times to complete processing for one row, with the data history being reinitialized at the start of every row.

Each node requires two successive row element entries from two successive rows to produce an output for the next higher node. Thus, nodes at h=1 (first step) will produce outputs for every other row of matrix inputs. Nodes at h=2 (second step) will produce outputs once every four rows of matrix inputs. In general, nodes at height h will produce outputs for every $2^h$ rows of matrix inputs. The actual operation carried out at node (h, k) for row r is denoted $T_r(h, k)$. Note also that the actual computations in every node are identical, i.e., two x and two y-transforms.

Figures 8A, 8B:
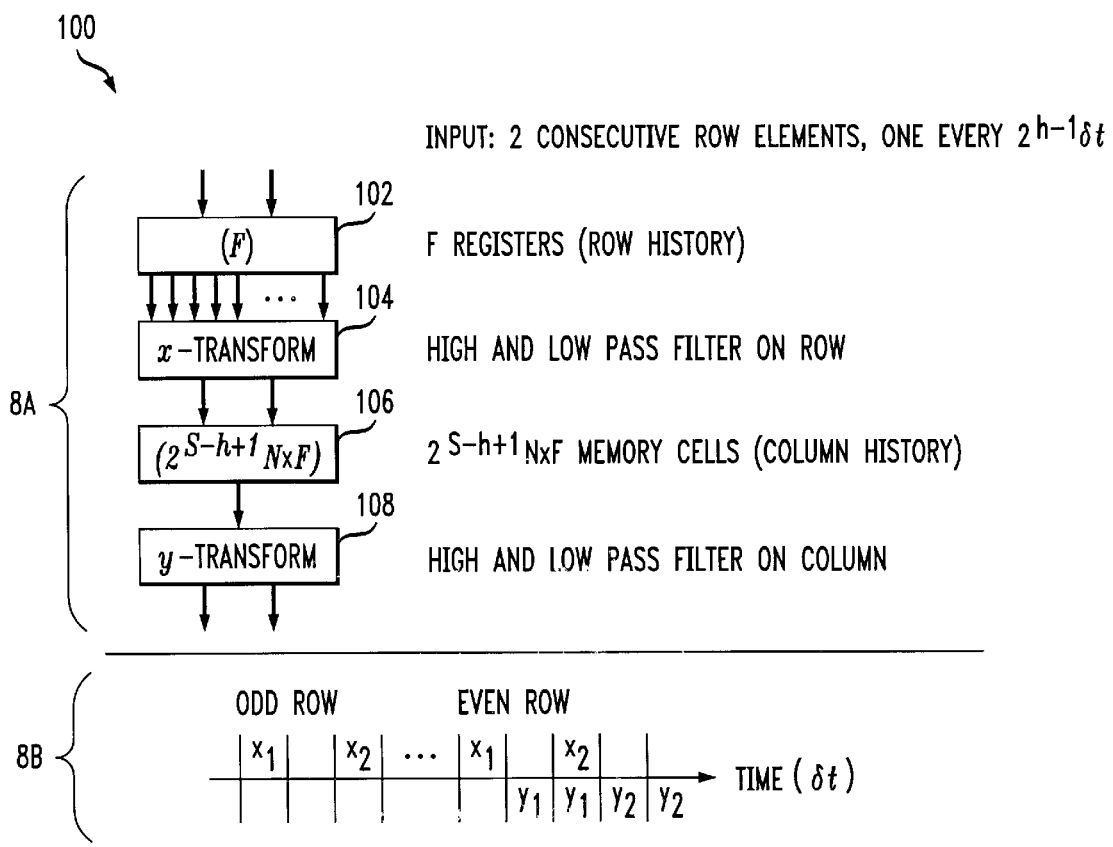
FIGS. 8A and 8B show an illustrative embodiment of a hardware processing element and corresponding execution time line, respectively, for implementing a first stage of a multi-stage wavelet transform in accordance with the invention.

FIG. 8 shows an example of a hardware element 100 that implements the computations of a particular node. Assume that matrix data arrive in row major order, at a constant rate of one element every δt seconds. The hardware element 100 includes a set of F registers for storing a set of consecutive row elements, i.e., the filter inputs required for an x-transform; an adder tree element 104 for computing an x-transform; a memory 106 for storing $2^h N$ columns, i.e., the filter inputs for a y-transform; and a second adder tree element 108, similar to the first adder tree element 104, for computing a y-transform.

Real time processing requires that the adder trees 104, 108 be able to execute in time $t \leq \delta t$, to meet an overall requirement that output to the next step be produced in time 2 δt. This follows from the observation that the computations may be carried out systolically: the second y-transform for a given node may overlap with the x-transform the next node, as shown in FIG. 8. The first of the two y-transforms corresponding to the execution of a flow graph node should produce the output for the next wavelet transform step.

Referring again to FIG. 7, it can be seen that each node can be processed systolically in time 2δt. If the $2^{S-1}$ leaf nodes in this tree are split off for the first stage of processing, the hardware element 100 in FIG. 8 can process these nodes in real time in $2^S \delta t$ sec. Since the remaining nodes from step h=2, 3, . . . S number $2^{S-1}-1$, one less than the nodes in the first stage, they can be executed in real time with just one additional hardware element. This multi-stage hardware element 110 may be derived from the original hardware element 100 of FIG. 8 by adding a total of S-1 sets of input registers, i.e., one each to hold the row input history for a given step, and feeding outputs for the next step back into the corresponding input register set.

Figures 9, 10:
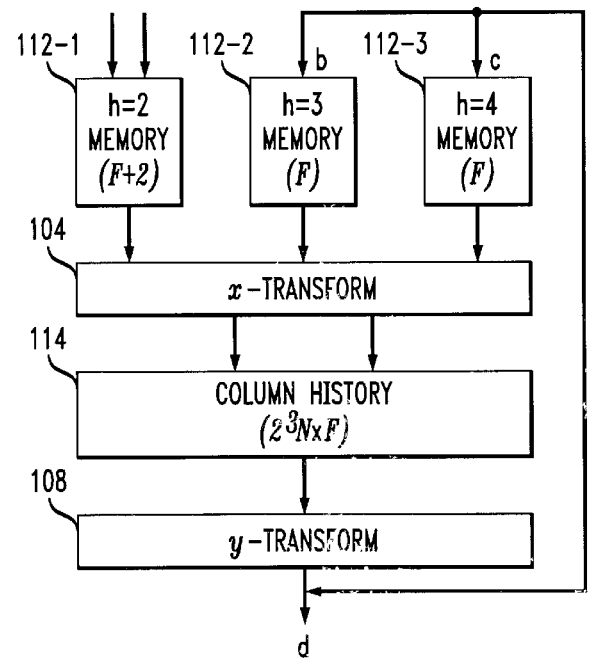
FIG. 9 shows an illustrative embodiment of a hardware processing element for implementing a time-multiplexing of second, third and fourth stages of a four-stage wavelet transform in accordance with the invention.
FIG. 10 shows an example of a multi-stage processing schedule for an illustrative four-stage wavelet transform in accordance with the invention.

FIG. 9 shows an example of one such additional multi-stage hardware element 110, for the case S=4. The element 110 includes the adder tree elements 104 and 108 of FIG. 8, along with memory elements 112-1, 112-2 and 112-3 associated with steps h=2, 3 and 4, respectively, and a memory 114 for storing $2^3 N \times F$ columns.

Scheduling of the computations must satisfy the requirements of the SDF graph of FIG. 7. Post-order traversal of the embedded binary tree satisfies the input requirements. The details of the minimum latency schedule are given in Equation (8) below.

FIG. 10 shows the resulting execution schedule for the case S=4. To account for the latency, an additional buffer of S−2 elements may be required at the input of the multi-stage hardware element, as is indicated by Equation (10). As explained previously, nodes from a given step h execute only once every $2^h$ rows. The schedule shown in FIG. 10 allows all nodes to execute. When not needed, the time slots that would otherwise be used are simply left void. The overall execution period of the FIG. 10 schedule thus includes $2^S$ distinct steps. The actual computations $T_r(h, k)$ performed in the multi-stage hardware element 110 are one of the following operations:

1. X(n)—x-transforms for node n (odd row processing),
2. XYY(n)—x and two y-transforms for node n (even row processing), and
3. NOP—no operation.

FIG. 11 shows the actual computations for the case S=4, for each of the successive $2^4$ rows of the processing period.

Derivation of Synchronous Data Flow (SDF) Schedule

The derivation of the processing schedule set forth in FIGS. 10 and 11 will now be described in greater detail, with reference to a complete binary tree of height s, with nodes arranged in post order. It will be shown that, for an SDF graph represented by a binary tree of height S=s+1, with data flowing from the leaves to the root of the tree, processing can be broken into a first stage portion comprising the $2^s$ leaf nodes in the tree, and a multi-stage portion comprising the remaining $2^s-1$ nodes.

If processing at each node is bounded by a fixed amount of time Δt, then the overall execution time required for the multi-stage processing is Δt less than the time for the first stage processing. It will be assumed for clarity of illustration that Δt=2 δt. If the computations are carried out repeatedly, the two processing units can therefore operate systolically. Assume that execution at each node produces the exact number of output tokens required as inputs on the path to the next higher node. A naive schedule for this graph is to simply delay processing of the second stage until the first stage completes $2^s$ nodes, i.e., until it produces a complete set of inputs for the next level in the tree. The multi-stage can then carry out its computations by traversing the tree in post order. In the following, we investigate improvements to this scheduling algorithm to minimize the processing latency and to reduce the memory requirements.

At any height h in the tree, there are $N_h=2^{s-h}$ nodes, also referred to as cousins. The tree thus comprises a total of $N=\Sigma N_h=2^s-1$ nodes. If nodes are numbered in post order, the node (h, k), i.e., the $k^{th}$ cousin from the left at height h, will be numbered $$p_{hk} = 2^h k - \sum_{i=0}^{s-h-2} K_i - 1, \quad 1 \leq k \leq 2^{s-h}, \quad 1 \leq h \leq s, \quad (4)$$

where the $K_i$ are the coefficients in the binary representation of k−1, $$k - 1 = \sum_{i=0}^{s-h-2} K_i 2^i, \quad K_i \in \{0, 1\}. \tag{5}$$

Since $1 \leq k \leq 2^{s-h}$, $$0 \leq \sum_{i=0}^{s-h-1} K_i \leq s - h. \tag{6}$$

Two sets of nodes are of particular interest: the leftmost nodes (at k=1) and the rightmost nodes (at $k=2^{s-h}$). They are numbered $$p_{h1}=2^h-1, \text{ and } p_{h2^{s-h}}=2^s-s+h-1. \tag{7}$$

The rightmost siblings are thus numbered consecutively with height, from $2^s-s$ to $2^s-1$, and are the last to be assigned.

In the following, it is assumed that the binary tree represents a static data flow graph for a set of tasks, i.e., each nodes represents a computation, and each edge represents the flow of data between the corresponding nodes. It is also assumed that execution of each node produces the exact number of output tokens required as inputs on the path to the next higher node. A possible order of execution is obtained by post order numbering. Other execution orders may be obtained through permutations of the post-ordered nodes that do not violate the required predecessor relationships, e.g., order all nodes at a given height h from left to right prior to moving to nodes at height h+1. Note that the post order schedule represents a greedy scheduling algorithm in that a node is allowed to execute as soon as its input requirements are satisfied.

With regard to the execution time, a number of assumptions are made as to when input data for the nodes at height h=1 becomes available, as well as to a maximum duration for the execution of each node. More particularly, it is assumed that computations for any node require a time $t \leq \Delta t$. It is also assumed that input data for the nodes at coordinates (1, k) becomes available at time $t_k=(2k-1)\Delta t$ at the latest. All input data to the binary tree then arrive in a time interval of length $2^s\Delta t$. Since computations for the $2^s-1$ nodes in the binary tree can be carried out in time $T \leq (2^s-1)\Delta t$, the schedule will allow for an idle period of $\Delta t$. The minimum latency execution schedule is obtained by noting that input data for the rightmost node $(1, 2^s-1)$, i.e., node number $2^s-s$, arrives by time $t=(2^s-1)\Delta t$. An attempt is thus made to schedule execution of the last s nodes to begin in the immediately following time slot $(2^s-1)\Delta t < t < 2^s \Delta t$. To reduce the buffer requirements for the input data to the tree, an attempt is made to schedule the idle period in the immediately preceding time slot. Thus, node (h, k) is scheduled to begin execution at time $$T_{hk} = (p_{hk} + s\xi_{hk})\Delta t \tag{8}$$

$$= \left(2^h k - \sum_{i=0}^{s-h-2} K_i + s - \xi_{hk} - 1\right)\Delta t$$

where $$\xi_{hk} = \begin{cases} 2, & p_{hk} < 2^s - s \\ 1, & p_{hk} \geq 2^s - s \end{cases},$$

and the $K_i$ are as defined in Equation (5). Note that the conditions in the definition of $x_{hk}$ could also be written $k < 2^{s-h}$ and $k^3 2^{s-h}$ respectively. To guarantee feasibility of this schedule, it remains to be shown that input data for each node (1, k), which arrives by $t=(2k-1)\Delta t$, is indeed available prior to its scheduled execution time $T_{1k}$. Substituting Equation (6) into Equation (8), it can be seen that $T_{1k} \leq (2k-1)\Delta t$, as required.

The first $2^s-s-1$ processing nodes are thus allocated to successive time slots of length $\Delta t$, with the first node beginning execution after $T_{11}=(s-1)\Delta t$, i.e., immediately after s data items have been received. The remaining nodes are allocated to the s time slots immediately following the receipt of all input data required for the tree, i.e., starting from $T_{12}{}^{s-1}=2^s\Delta t$. In the time required to complete the processing, s data items will arrive for the next tree in the sequence, thus allowing the schedule to execute sequentially without interruption.

Storage Requirements

The data storage requirements associated with the above-described wavelet transform processing will now be described. The post order execution of the nodes guarantees that all higher level nodes (h>1) execute as soon as their input data are available, i.e., the input storage requirements for these nodes is the exact amount of data required for the node to execute. For the illustrative wavelet transform process described above, this is equal to $M_h=\max(F, 2)$. For nodes at the lowest level h=1, however, additional storage must be provided to account for the time delay between the arrival of the data to the time when the data is processed.

As mentioned above, the computational latency will require at least s data items to be stored before computations actually start. By the time processing of node (h, k) terminates, an additional $P_{hk}$ data items will have been received. The number of data items that will have been processed by that time is given by $2^h-k-2\delta_{h1}$. The number of data items that need to be stored at h=1 is thus given by $$M'_1 = \max_{h,k}(s, (p_{hk} + s) - (2^h k - 2\delta_{h1})) \leq s + 1. \tag{9}$$

For the illustrative wavelet transform process described above, two of these data items are part of the history F. Storage is therefore required for $$M_1 = \max(F, 2) + s - 1 \tag{10}$$

data items at the leaf nodes of the tree.

Boundary Processing

A number of issues relating to boundary processing will now be addressed, including step activation, end of row processing, and end of frame processing.

With regard to step activation, a startup mirroring condition requires $R_b$ samples to be obtained before the filtering transforms can be executed for the first time. Since two consecutive inputs are required before any outputs are produced (i.e., before the y-transform can execute), this delays the startup of the first execution of any given step h by multiple rows. If $r_h$ is the row index (starting from 0), for which step h first receives input, $r_0=0$, $r_1=r_0+(R_b-1)=(R_b-1)$, $r_2=r_1+2(R_b-1)=(1+2)(R_b-1)$, $r_h=r_{h-1}+2^{h-1}(R_b-1)=(2^0+2^1+2^2+\ldots+2^{h-1})(R_b-1)$.

In other words, the number of input rows required to produce an output at a given step doubles at every step. Thus, a given step h becomes active for the first time at row index $$r_h = (2^h - 1)(R_b - 1),$$

and thereafter produces outputs every $2^h$ rows. For the multi-stage processing, $r_h$ is an element of the set $\{0, 4, 12, 28, 60\}$.

With regard to end of row processing, when the last sample of a given row has been received, a transform step will produce a further $R_e$ intermediate result samples by mirroring internal x-transform data. However, any data produced, i.e., if the y-transform is active in the current row, will be part of the row input for the next transform step one level higher. Once a given step completes its $R_e$ samples, the next level, provided it has been receiving inputs, must then in turn generate $R_e$ samples by mirroring. Given the row index r, a particular level h is active, i.e., receiving inputs, if $$r \geq r_h,$$

and if $$(r - r_h) \equiv 0 \pmod{2^h}.$$

The number of active steps is therefore the maximum value $h_{max}$ of h satisfying the two conditions above. An example set of pseudocode for implementing the above-described end of row processing is therefore given by

```
for level h = 0 to h_max {
    until level h has produced the remaining R_e results {
        run_eor (h)
    }
}
``` where run_eor (h) internally schedules executions for higher level steps according to the previously-described greedy algorithm. More specifically,

```
run_eor (h) {
    set 1 to highest level ≥ h that can execute
    if (1 = h) generate x data by mirroring
    run step 1
}
```

In order to determine how many times run_eor will have to execute before the loop terminates, consider an active level h. Since two new inputs are needed for a given step to produce one output to the next higher step, R results received from the step at level h−1 will allow a further floor(R/2) nodes to be processed, prior to generating another $R_e$ mirroring results. Note that since the lowest level is generating its data by mirroring, the node executions in this loop cannot stall for lack of data. Since each execution implies an x-transform and two y-transforms will be carried out in the time available, however, the lowest level execution may require idle time slots to be inserted.

Let $n_h$ be the number of executions required at a given active level. If the next level is also active, $n_h$ is also the number of outputs generated. Thus, $$n_0 = R_e, \text{ and}$$

$$n_h = \lfloor n_{h-1}/2 \rfloor + R_e, \ 0 < h < h_{max}.$$

For the multi-stage, the end of row execution counts are therefore $n_h$ contained in the set $\{2, 5, 8, 11, 14\}$.

With regard to end of frame processing, a further complication arises. At this point, all row input data have been processed, but the y-transforms for the intermediate data in a given stage still require mirroring. While this occurs, a given step will produce data for the next higher level, which therefore still processes input rows and carries out the corresponding end of row processing described above. Once the lowest level terminates, the next level up begins mirroring intermediate data. The process continues until all $h_{tot}$ levels complete their y-transform mirroring operations. An example set of pseudocode for implementing these end of frame processing operations is therefore given by

```
for level h = 0 to h_tot {
    until level h has completed the last row {
        until level h has completed the current row {
            run_eof (h)
        }
        // higher level frames are still running, however
        for level h' = h+1 to h_max {
            until level h' has produced the remaining R_e results
            {
                run_eor (h)
            }
        }
    }
}
```

Pseudocode for the run_eof routine is as follows

```
run_eof (h) {
    set 1 to highest level ≥ h that can execute
    if (1 = h) generate y-data by mirroring
    run step 1
}
```

Whether a given operation can execute is determined by its internal input data counts and whether it has run before with the currently available data.

Constructing LIFTS Trees from the Wavelet Processor Outputs

This section will focus on the final results produced by execution of individual nodes in the previously-described SDF graphs. Consider the matrix $p_{ij}$ and its wavelet transform $\hat{p}_{ij}$, wherein $1 \leq i \leq 2^S N$, $1 \leq j \leq 2^S M$. Each step of the non-standard decomposition results may be stored by recursively subdividing a matrix $\hat{p}$ into quadrants $\hat{p}^{h_k}$ corresponding to each of the four possible choices of index sets.

FIG. 12 shows a table listing these four quadrants. The letters composing a quadrant index k denote the applied high or low pass filter of the x-transform and y-transform, respectively, and h denotes the transform step. Each successive step of the transform is applied to the first quadrant k=LL. Examining the outputs of the exemplary schedule described previously, it can be seen that the quadrants are filled in row major order. Each xyy node execution yields four outputs: the first application of the y-transform results in the current k=LL and k=LH entries, while the second y-transform results in the k=HL and k=HH entries. Since the schedule expresses a greedy algorithm, results for step h+1 are produced as soon as a new 2×2 submatrix of $\hat{p}^{h_k}$ becomes available.

Figures 13, 14:
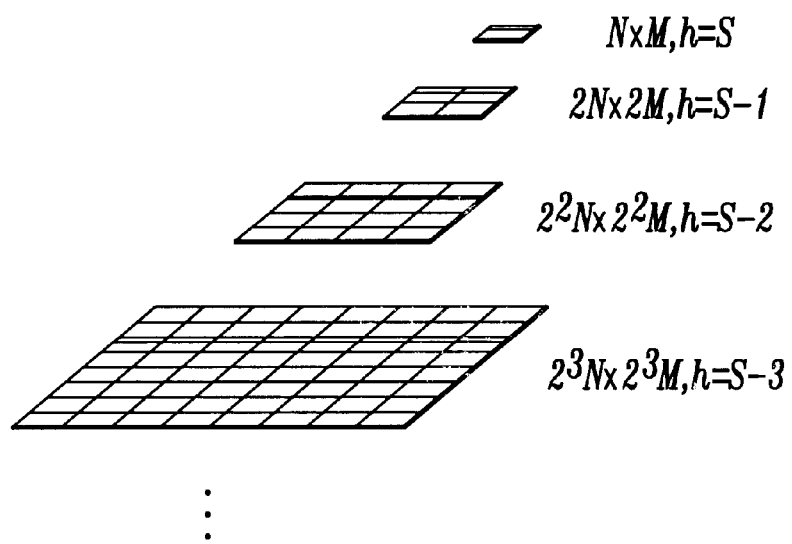
FIGS. 13 and 14 show a pyramid of submatrices and a tree set, respectively, for a given multi-stage wavelet transform in accordance with the invention.

If k is fixed, the matrices $\hat{p}^{h_k}$, h=1, 2, . . . , S can be viewed as cuts in a pyramid of submatrices, with the largest matrix of size $(2^{S-1}N) \times (2^{S-1}M)$ at the bottom and the smallest N×M sized matrix at the top, as shown in FIG. 13. The schedule fills in submatrices one row at a time. With greedy scheduling, an entry at a higher level is produced whenever a 2×2 submatrix in the level beneath it is completed. Thus, only one row in each submatrix is active at a given time.

A given entry $\hat{p}h+1^k(i, j)$ is produced as soon as the elements $O^{h_k}(i, j) = \{\hat{p}^{h_k}(2i-1, 2j-1), \hat{p}^{h_k}(2i, 2j-1), \hat{p}^{h_k}(2i, 2j)\}$ are available. It is this relationship that is exploited in the List-Free Tree Set Scanning (LIFTS) algorithms described in the above-cited U.S. patent application of E. Ammicht et al. Viewed top down, the entries $\hat{p}^{S_k}(i, j)$ form the root nodes of a set of 3NM trees of height S expressing this data relationship, excluding k=LL, which does not have any associated tree structure. In the above-described schedule, the tree elements are produced bottom up, with up to 3N trees active at any given time.

"On The Fly" Significance Parameter Computations

Zero tree coding algorithms generally need to know, given an integer value v, the position of its most significant bit. Given the binary expansion $$|v| = 2^{b-1} + \sum_{i=1}^{b-1} v_i 2^{i-1}, \quad v_i = \{0, 1\},$$

the position of the most significant bit is defined as $$B(v) = \begin{cases} b & v \neq 0 \\ 0 & v = 0 \end{cases}.$$

In this definition, bit positions are counted from 1. For a set of numbers V, the position of the most significant bit is similarly defined as $$B(V) = \max_{v \in V}(B(v)).$$

For the wavelet coefficient hierarchical trees described by $O^{h_k}(i, j)$ above, two sets are of particular interest: the set $D_1(v)$ of all descendants of a particular node v, and the set $D_2(v)$ of all grandchildren and their descendants of a particular node v. These sets are denoted by $$B_1(v) = B(D_1(v)), B_2(v) = B(D_2(v)).$$

Given a bit number b, a coefficient v is significant if $B(v) \geq b$, the direct descendants are significant if $B_1(v) \geq b$, and the indirect descendants are significant if $B_2(v) \geq b$.

The computation of the parameters B(v), $B_1(v)$ and $B_2(v)$ of a given tree node can be carried out recursively from the bottom up. Thus, e.g., given $B(c_i)$ and $B_1(c_i)$ for each child $c_i$ of a node v, $$B_2(v) = \max_i(B_1(c_i)),$$

$$B_1(v) = \max_i(B(C_i), B_2(v)).$$

The expressions for the startup conditions can be simplified by further defining the significance of the empty set $B(\phi) = -1$.

Since the tree elements are produced from the bottom up, this recursion relationship can be used to compute the significance parameters at the same time as the wavelet coefficients. Thus, the computations can be carried out, e.g., by enhancing the multi-stage hardware element to:

1. Accept the three final results $c_k$ (one from each quadrant k,) produced by the xyy transform from a previous step as inputs to a descendant parameter computation unit, together with the associated descendant parameters $B_1(c_k)$, 2. Enhance the x-transform computation to include significance parameter computation processing of the top row of the 2×2 submatrix of children $c_k$ for the current node. Due to edge effects produced by mirroring, it is preferable to compute partial significance parameters as soon as the data arrives, and store them until the corresponding wavelet coefficient is computed in the xyy-transform step. This minimizes the amount of memory required for temporary storage.

3. Enhance the xyy-transform computation to include processing of the bottom row of the current 2×2 submatrix of children $c_k$, with outputs of the three final results and current LIFTS descendant parameter information to the next step.

Note that the LIFTS-related computations are therefore produced on the same schedule as the wavelet transform coefficients. Note also that the recursion relationship may be written in a number of different ways, including the use of "bitwise or" operations, resulting in a number of variants to the illustrative approach described here.

Tree Storage Requirements

A given tree has size $T=(4^S-1)/3$. One possible storage technique therefore is to store the set $\pi(i,j)$ comprising the three trees k=LH, HL, HH with roots at $\hat{p}^{S_k}(i, j)$, followed by the element at $\hat{p}^{S_{LL}}(i, j)$ in consecutive memory locations. This corresponds to the order in which the data actually is produced.

FIG. 14 shows an example of a tree set $\pi(i,j)$. The above-described wavelet transform computes one entry in each of the k=LH, HL, HH trees of the tree set $\pi(i,j)$ at a time. When a given level is active in accordance with the greedy schedule, an entire row of $2^{s-h}$ entries at that level will be produced in succession before computations proceed to the next of N tree sets that are active at a given time, i.e., the submatrices are filled in one row at a time. Once N tree sets are complete, the wavelet transform starts on a new set of N tree sets.

The storage required for each tree set $\pi(i,j)$ is $4^S$ matrix entries, together with associated significance parameters. As previously noted, a total of N such sets (from a total of N×M such sets) are under construction at a given time, with results produced in round-robin fashion as successive rows in each subtree of a given set are completed. The set-to-set stride in memory is therefore $4^S$, while the tree-to-tree stride within a set is T.

The above-described wavelet transform produces the $\pi(i, j)$ in row-major order. For a given (i,j), each level in the tree pyramid, i.e., each $\hat{p}^{h_k}$ submatrix, is similarly produced in row major order. To produce a 2×2 submatrix at any given level in the pyramid, one therefore has to store a complete row from every level, i.e., $2^S-2$ entries per tree for 3N trees, plus additional entries to complete the desired number m of submatrices at a given level. The highest level in the tree comprises a single element and need not be counted in the 2×2 submatrices. If m submatrices are desired, the storage requirement is $3N(2^S-2)+6Sm$ elements.

The above-described embodiments of the invention are intended to be illustrative only. For example, other embodiments of the invention may utilize different numbers of processing stages, different hardware elements to implement the processing, and different processing schedules. The invention may be implemented in whole or in part in a processing device such as an application-specific integrated circuit (ASIC) or other type of digital data processor suitable for implementing at least a portion of a wavelet transform. The invention may also be implemented at least in part in the form of software which may be stored in a machine-readable medium and executed to implement one or more of the wavelet processing functions described herein. These and numerous other alternative embodiments within the scope of the following claims will be apparent to those skilled in the art.

What is claimed is:

1. An apparatus for implementing a multi-stage wavelet transform of an image signal, the apparatus comprising:
   a first stage processing element for implementing a first stage of the wavelet transform; and
   a multi-stage processing element for implementing at least two subsequent stages of the multi-stage wavelet transform in a time-multiplexed manner, using outputs generated by the first stage processing element;
   wherein the first stage processing element and the multi-stage processing element are each configured to provide both horizontal and vertical filtering of pixel data associated with the image signal.

2. The apparatus of claim 1 wherein the first stage processing element comprises a horizontal and vertical filter which operates on pixels of the image signal at a sampling rate $f_s$.

3. The apparatus of claim 2 wherein the multi-stage wavelet transform includes at least four stages, and the multi-stage processing element performs processing operations for at least second, third and fourth stages of the wavelet transform in a time-multiplexed manner.

4. The apparatus of claim 3 wherein the multi-stage processing element receives inputs from the first stage processing element at a sample rate of $f_s/4$, generates coefficients for the second stage at a sample rate of $f_s/16$, generates coefficients for the third stage at a sample rate of $f_s/64$, and generates coefficients for the fourth stage at a sample rate of $f_s/256$.

5. The apparatus of claim 3 further including a multiplexer for selecting outputs of the first stage processing element and outputs of second and third stage portions of the multi-stage processing element for application to inputs of the multi-stage processing element.

6. The apparatus of claim 2 wherein the multi-stage wavelet transform includes six stages, and the multi-stage processing element performs processing operations for second, third, fourth, fifth and sixth stages of the wavelet transform in a time-multiplexed manner.

7. The apparatus of claim 1 wherein operations performed by the first stage processing element correspond to lowest-level nodes of a binary tree representation of a processing schedule for the multi-stage wavelet transform, and the operations performed by the multi-stage processing element correspond to the remaining nodes of the binary tree representation.

8. The apparatus of claim 1 wherein at least one of the processing elements generates output information in the form of trees configured in accordance with a list-free tree set scanning algorithm, the output information comprising significance parameters generated for each of at least a subset of a set of tree nodes.

9. An apparatus for implementing a multi-stage wavelet transform of an image signal, the apparatus comprising:
   a first stage processing element for implementing a first stage of the wavelet transform; and
   a multi-stage processing element for implementing at least two subsequent stages of the multi-stage wavelet transform in a time-multiplexed manner, using outputs generated by the first stage processing element;
   wherein the first stage processing element comprises a horizontal and vertical filter which operates on pixels of the image signal at a sampling rate $f_s$;
   wherein the first stage processing element further comprises:
   a first adder tree for implementing horizontal filter operations;
   a set of row buffers configured to receive low pass and high pass outputs of the first adder tree;
   a set of multiplexers, with a given one of the multiplexers coupled between the outputs of the adder tree and an input of a corresponding one of the row buffers, and operative to select application of a low pass output or a high pass output of the first adder tree to the corresponding row buffer; and
   a second adder tree for implementing vertical filter operations, the second adder tree receiving its inputs from the set of row buffers, and generating vertically-filtered outputs one row at a time.

10. The apparatus of claim 9 wherein the set of row buffers includes a number of row buffers greater than the number of pixels required to generate a given one of the vertically-filtered outputs.

11. An apparatus for implementing a multi-stage wavelet transform of an image signal, the apparatus comprising:
    a first stage processing element for implementing a first stage of the wavelet transform; and
    a multi-stage processing element for implementing at least two subsequent stages of the multi-stage wavelet transform in a time-multiplexed manner, using outputs generated by the first stage processing element;
    wherein each of the first stage processing element and the multi-stage processing element comprises:
    a set of row history memory elements;
    a first adder tree for performing x-transform operations;
    a set of column history memory elements; and
    a second adder tree for performing y-transform operations.

12. The apparatus of claim 11 wherein the row history memory elements for the first stage processing element include at least F memory elements, where F is the maximum of $F_L$ and $F_H$, where $F_L$ and $F_H$ are the number of filter taps for low and high pass filters, respectively, implemented by at least one of the first and the second adder trees.

13. The apparatus of claim 11 wherein the column history memory elements for the first stage processing element include at least $2^{S-h+1} N \times F$ memory elements, where S denotes a total number of transform steps, h denotes a particular one of the S transform steps, and F is the maximum of $F_L$ and $F_H$, where $F_L$ and $F_H$ are the number of filter taps for low and high pass filters, respectively, implemented by at least one of the first and the second adder trees.

14. The apparatus of claim 11 wherein the row history memory elements for the multi-stage processing element include first, second and third sets of row history memory elements, wherein the first set of memory elements is associated with a second stage of the wavelet transform and includes at least F+2 memory elements, where F is the maximum of $F_L$ and $F_H$, where $F_L$ and $F_H$ are the number of filter taps for low and high pass filters, respectively, implemented by at least one of the first and the second adder trees, and further wherein the second and third sets of row history memory elements are associated with third and fourth stages of the wavelet transform, and each includes at least F memory elements.

15. The apparatus of claim 11 wherein the column history memory elements for the multi-stage processing element include at least $2^3 N \times F$ memory elements, where F is the maximum of $F_L$ and $F_H$, where $F_L$ and $F_H$ are the number of filter taps for low and high pass filters, respectively, implemented by at least one of the first and the second adder trees.

16. A method of implementing a multi-stage wavelet transform of an image signal, the method comprising the steps of:

implementing a first stage of the wavelet transform in a first stage processing element; and implementing at least two subsequent stages of the wavelet transform in a time-multiplexed manner in a multi-stage processing element;

wherein the first stage processing element and the multi-stage processing element are each configured to provide both horizontal and vertical filtering of pixel data associated with the image signal.

17. The method of claim 16 wherein the first stage processing element comprises a horizontal and vertical filter which operates on pixels of the image signal at a sampling rate $f_s$.

18. The method of claim 17 wherein the first stage processing element includes a number of row buffers greater than the number of pixels required to generate a given vertically-filtered output.

19. The method of claim 17 wherein the multi-stage wavelet transform includes at least four stages, and the multi-stage processing element performs processing operations for at least second, third and fourth stages of the wavelet transform in a time-multiplexed manner.

20. The method of claim 19 wherein the multi-stage processing element receives inputs from the first stage processing element at a sample rate of $f_s/4$, generates coefficients for the second stage at a sample rate of $f_s/16$, generates coefficients for the third stage at a sample rate of $f_s/64$, and generates coefficients for the fourth stage at a sample rate of $f_s/256$.

21. The method of claim 19 further including the step of selecting outputs of the first stage processing element and outputs of second and third stage portions of the multi-stage processing element for application to inputs of the multi-stage processing element.

22. The method of claim 16 wherein operations performed by the first stage processing element correspond to lowest-level nodes of a binary tree representation of a processing schedule for the multi-stage wavelet transform, and the operations performed by the multi-stage processing element correspond to the remaining nodes of the binary tree representation.

* * * * *